United States Patent [19]

Boehme et al.

[11] Patent Number: 5,508,802
[45] Date of Patent: Apr. 16, 1996

[54] METHOD AND APPARATUS FOR APPLYING A NANOLITER QUANTITY OF LIQUID TO A TARGET OBJECT WITHOUT SOLID CONTACT

[75] Inventors: Martin L. Boehme, Oregon City; Paul T. Schnackenberg, Beaverton, both of Oreg.

[73] Assignee: Photon Kinetics, Inc., Beaverton, Oreg.

[21] Appl. No.: 312,522

[22] Filed: Sep. 26, 1994

Related U.S. Application Data

[62] Division of Ser. No. 147,132, Nov. 2, 1993, Pat. No. 5,400,420.

[51] Int. Cl.⁶ .................................................. G01N 21/84
[52] U.S. Cl. ................................................... 356/73.1
[58] Field of Search .......................................... 356/73.1

[56] References Cited

U.S. PATENT DOCUMENTS

| | | | |
|---|---|---|---|
| 4,289,398 | 9/1981 | Robichaud | 356/73.1 |
| 4,390,897 | 6/1983 | Smithgall, Sr. | 356/73.1 |
| 4,448,483 | 5/1984 | Ryley, Jr. . | |
| 4,722,587 | 2/1988 | Thorsten . | |
| 4,725,137 | 2/1988 | Schmadel, Jr. | 356/73.1 |
| 4,746,189 | 5/1988 | Arrington et al. . | |
| 4,825,092 | 4/1989 | Mehadji | 356/73.1 |
| 4,887,883 | 12/1989 | Darbut et al. . | |
| 4,902,327 | 2/1990 | Levinson . | |
| 4,984,885 | 1/1991 | Ortiz, Jr. | 356/400 X |
| 4,990,770 | 2/1991 | Hemmann et al. | 356/73.1 |
| 5,038,359 | 8/1991 | Pepper et al. | 372/99 |
| 5,094,529 | 3/1992 | Meininghaus et al. | 356/73.1 |
| 5,127,725 | 7/1992 | Mueller et al. | 356/73.1 |
| 5,253,035 | 10/1993 | Fukuoka et al. | 356/73.1 |

FOREIGN PATENT DOCUMENTS

| | | | |
|---|---|---|---|
| 63-22206 | 9/1988 | Japan | 356/73.1 |

*Primary Examiner*—Vincent P. McGraw
*Attorney, Agent, or Firm*—Smith-Hill and Bedell

[57] ABSTRACT

Apparatus for optically coupling first and second optical fiber segments comprises a base frame (10), a support (14, 18) for supporting the second fiber segment relative to the base frame in an orientation in which its central axis is aligned with a horizontal optical axis (72), and a first displacement mechanism (40–64) for supporting the first fiber segment in a coaxially aligned relationship with the second fiber segment. The first displacement mechanism is operable selectively to displace the first fiber segment along the horizontal optical axis. A cup (122) contains a bath of index-matching liquid and is supported at a position below the horizontal optical axis. A second displacement mechanism (108, 110) supports a dipper (114, 118) so that the dipper is displaceable along a path such that a drop retaining portion of the dipper is first placed within the cup and is then raised so that the drop retaining portion of the dipper lies on the horizontal optical axis.

10 Claims, 8 Drawing Sheets

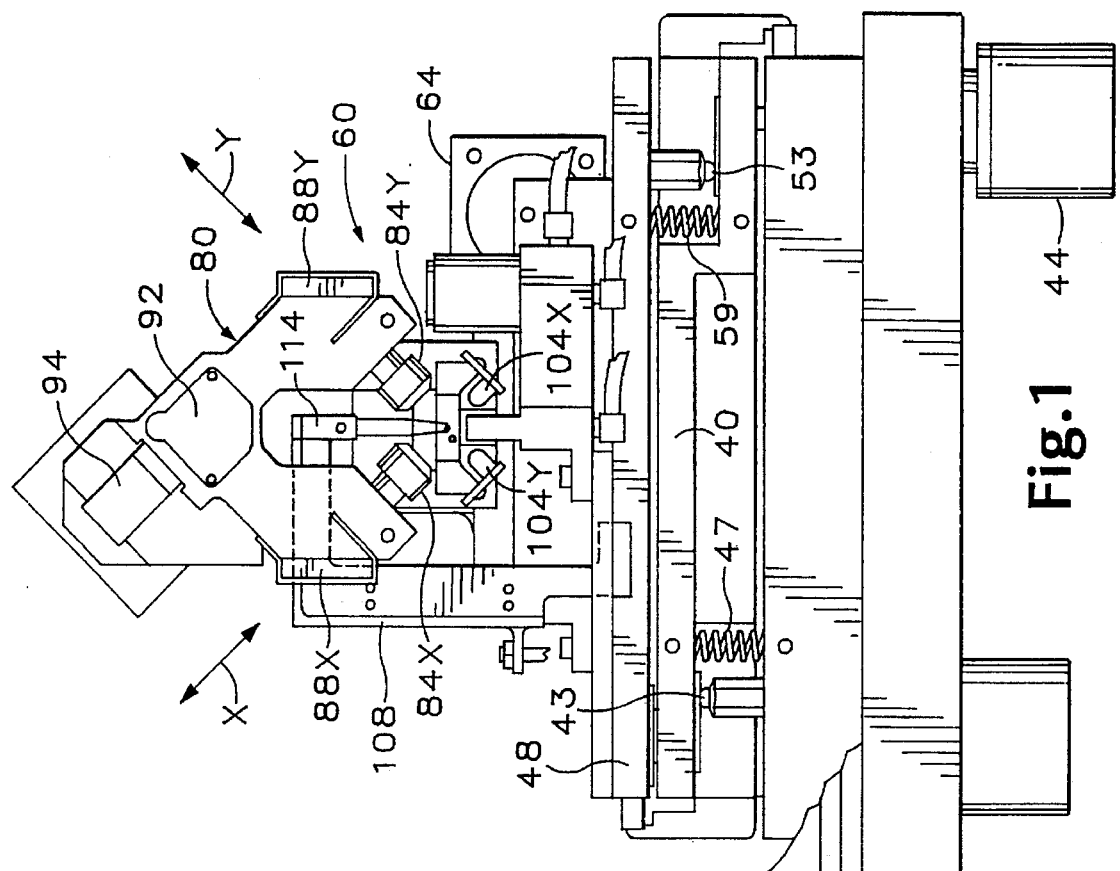
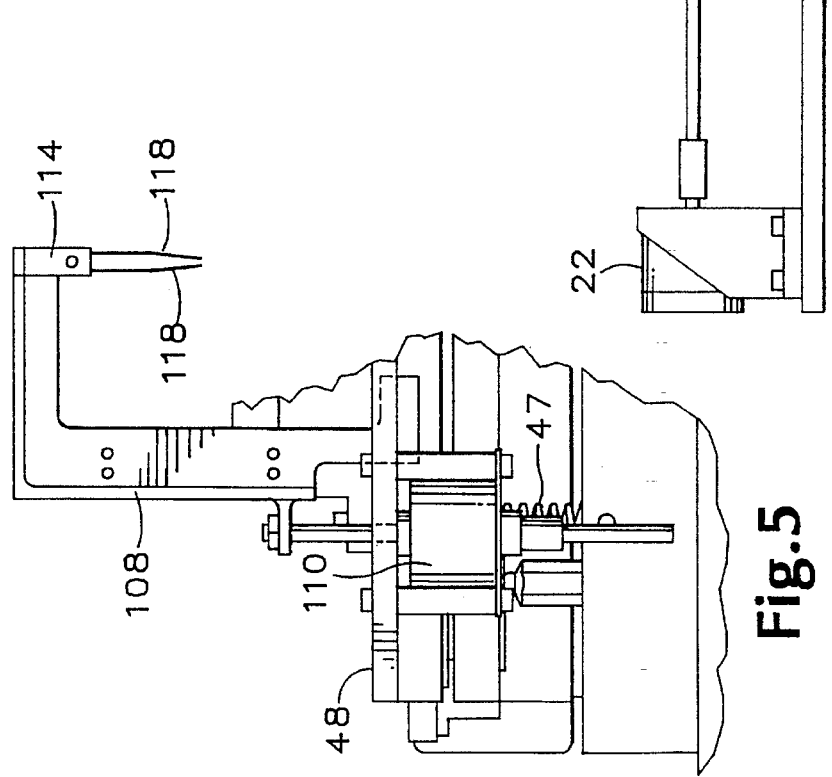

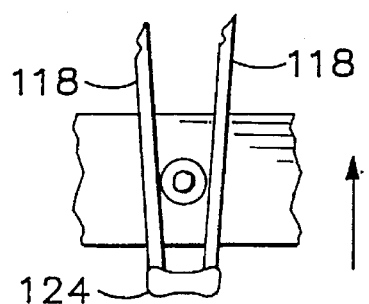
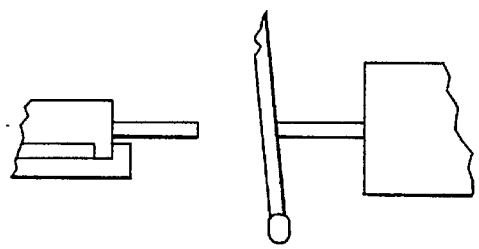
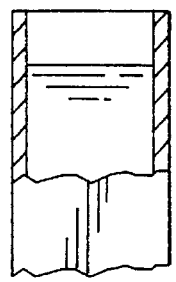
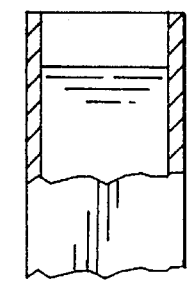
Fig.7A          Fig.7B
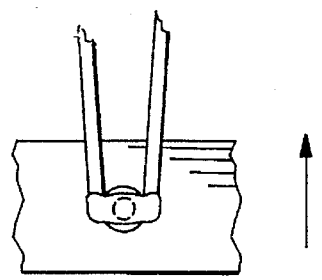
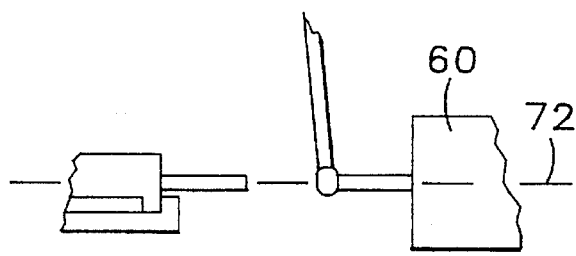
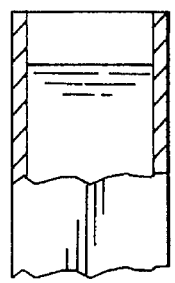
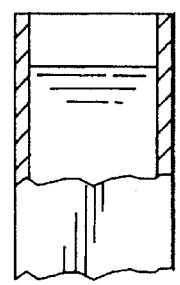
Fig.8A          Fig.8B

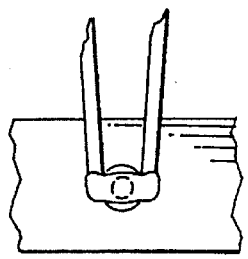
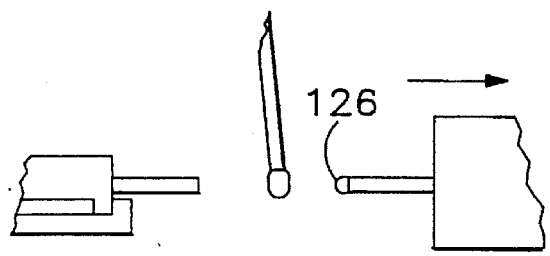
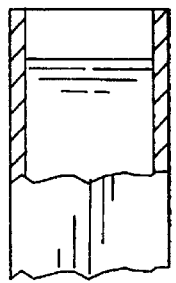
Fig.9A
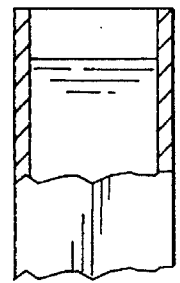
Fig.9B
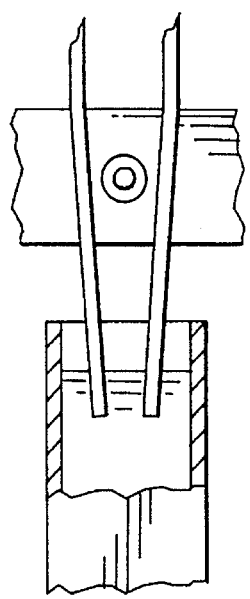
Fig.10A
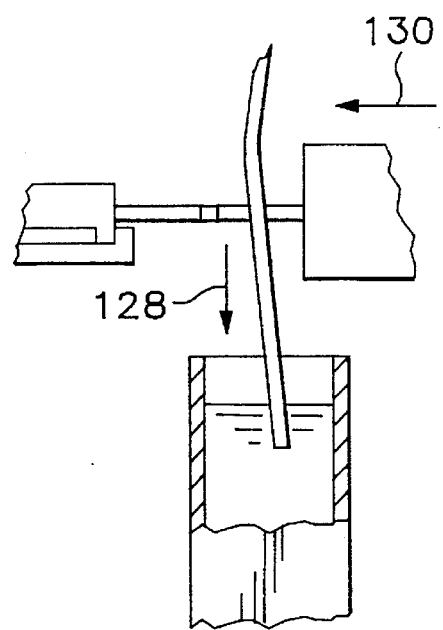
Fig.10B

METHOD AND APPARATUS FOR APPLYING A NANOLITER QUANTITY OF LIQUID TO A TARGET OBJECT WITHOUT SOLID CONTACT

CROSS-REFERENCE TO RELATED APPLICATION

This is filed as a divisional of patent application Ser. No. 08/147,132 filed Nov. 2, 1993, now U.S. Pat. No. 5,400,420.

BACKGROUND OF THE INVENTION

This invention relates to a method and apparatus for applying a nanoliter quantity of liquid to a target object without solid contact.

In the field of testing optical fibers using an optical time domain reflectometer (OTDR), it is desirable to be able to couple a buffer fiber, which is connected to the optical I/O port of the OTDR, to the test fiber (the fiber that is to be tested). The OTDR launches pulses of optical power into the test fiber by way of the buffer fiber, and measures the level of return optical power received from the test fiber by way of the buffer fiber.

In order to avoid or minimize high amplitude reflections at the interface between the buffer fiber and the test fiber, it is known to provide index-matching liquid between the end faces of the two fibers. In a known machine, this is accomplished by placing the proximal (relative to the OTDR) end segment of the test fiber in a V-shaped groove formed in a fixture that is immersed in a bath of index-matching liquid. The groove extends beyond the proximal end of the test fiber so that part of the groove is not occupied by the test fiber. The distal (relative to the OTDR) end segment of the buffer fiber is placed in the groove, so that it is essentially coaxial with the test fiber end segment, and the distal end of the buffer fiber is advanced toward the proximal end of the test fiber until the two ends are very close together. The index-matching liquid then provides good optical coupling between the two fibers.

A disadvantage of this known technique for coupling optical fibers is that it is rather cumbersome and inconvenient to carry out the coupling operation with the end segments of the fibers submerged in liquid. Further, particles of dirt can become lodged in the groove and either interfere with seating of the distal end segment of the buffer fiber or be trapped between the end faces of the two fibers and interfere with the optical coupling of the fibers.

SUMMARY OF THE INVENTION

In accordance with a first aspect of the present invention there is provided a method of applying a controlled quantity of liquid to a free end of a rod-shaped target object, comprising providing a bath of said liquid, a dipper member having two portions in spaced relationship, and a means for bringing about vertical relative movement between the dipper member and the bath, lowering the dipper member relative to the bath to at least partially immerse said portions of the dipper member in the bath, and subsequently raising the dipper member relative to the bath, whereby a drop of liquid is suspended between said portions of the dipper member, positioning the dipper member and the target object so that the free end of the target object is between said portions of the dipper member, and bringing about movement of the target object relative to the dipper member, whereby the free end of the target object is removed from between said portions of the dipper member and a portion of the drop adheres to the target object.

In accordance with a second aspect of the present invention there is provided a method of testing an optical fiber, comprising positioning a distal end of a buffer fiber in the vicinity of the proximal end of the test fiber, the distal end of the buffer fiber and the proximal end of the test fiber being exposed to ambient air, positioning the distal end of the buffer fiber and the proximal end of the test fiber so that they are in coaxially aligned relationship with their end faces separated and with index-matching liquid therebetween, and launching a pulse of optical energy into the test fiber by way of the buffer fiber and to detecting optical power emitted by the test fiber at an end thereof.

BRIEF DESCRIPTION OF THE DRAWINGS

Reference will now be made, by way of example, to the accompanying drawings in which:

FIG. 1 is a partial front elevation of apparatus for use in optically coupling a buffer fiber with successive test fibers in a ribbon, FIG. 5 is an enlarged view of a detail of FIG. 1, FIGS. 6A and 6B, 7A and 7B, 8A and 8B, 9A and 9B, and 10A and 10B are enlarged sectional views illustrating the configuration of part of the apparatus at successive times during the operating cycle of the apparatus, FIG. 11 is an enlarged sectional view of part of the apparatus.

DETAILED DESCRIPTION

Figure 2:
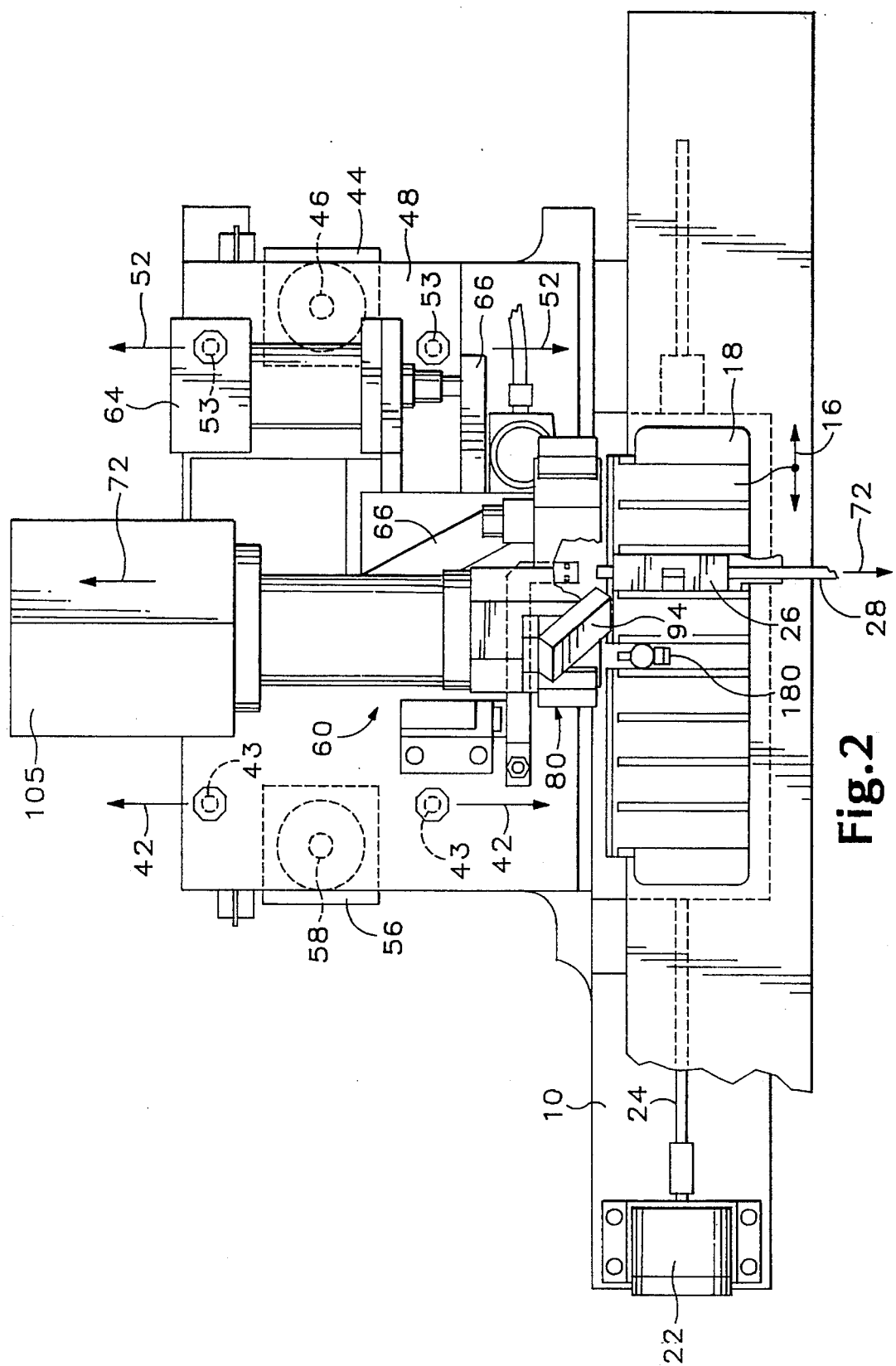
FIG. 2 is a partial plan view of the apparatus.
Figure 3:
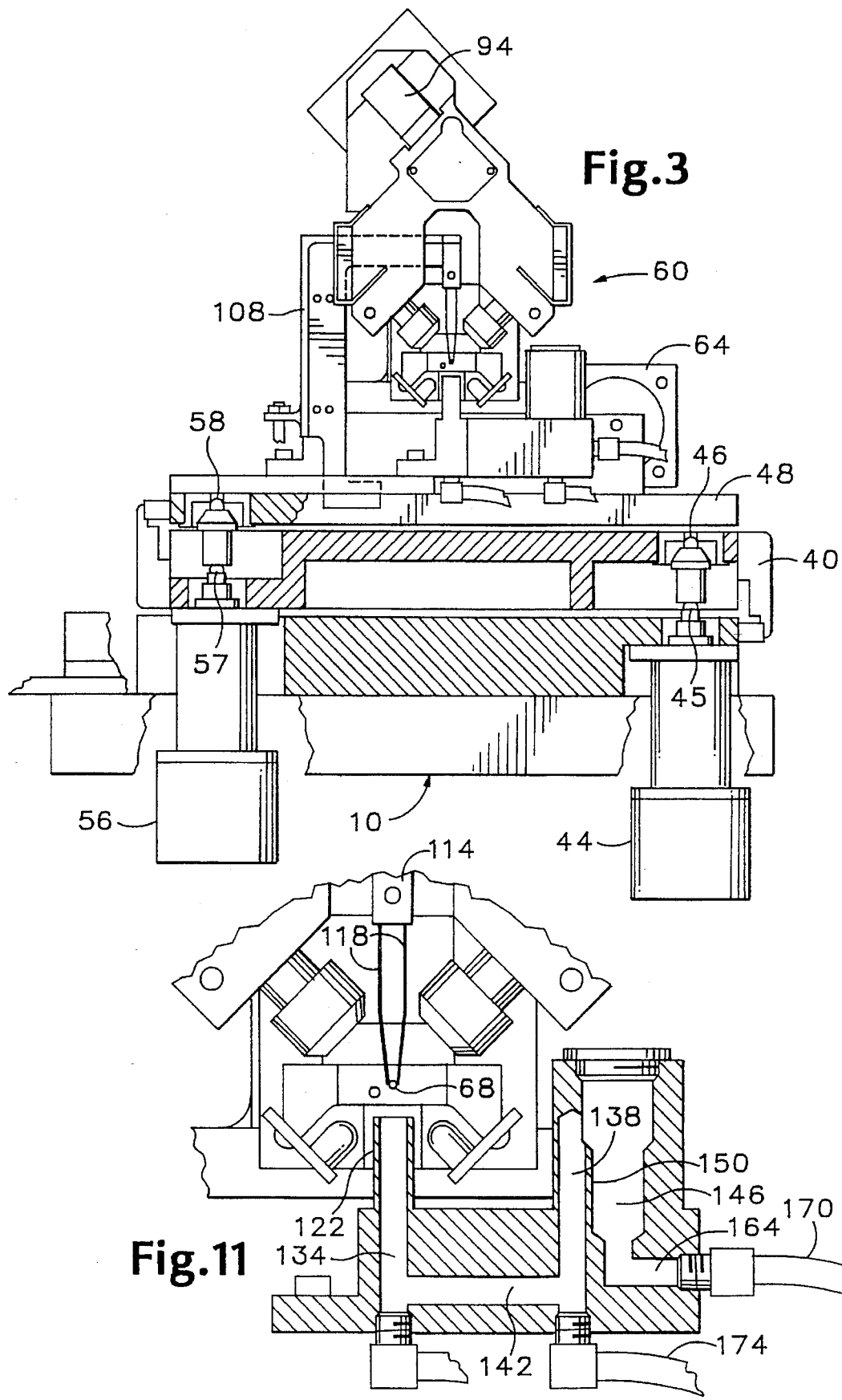
FIG. 3 is a front sectional view of the apparatus.
Figure 4:
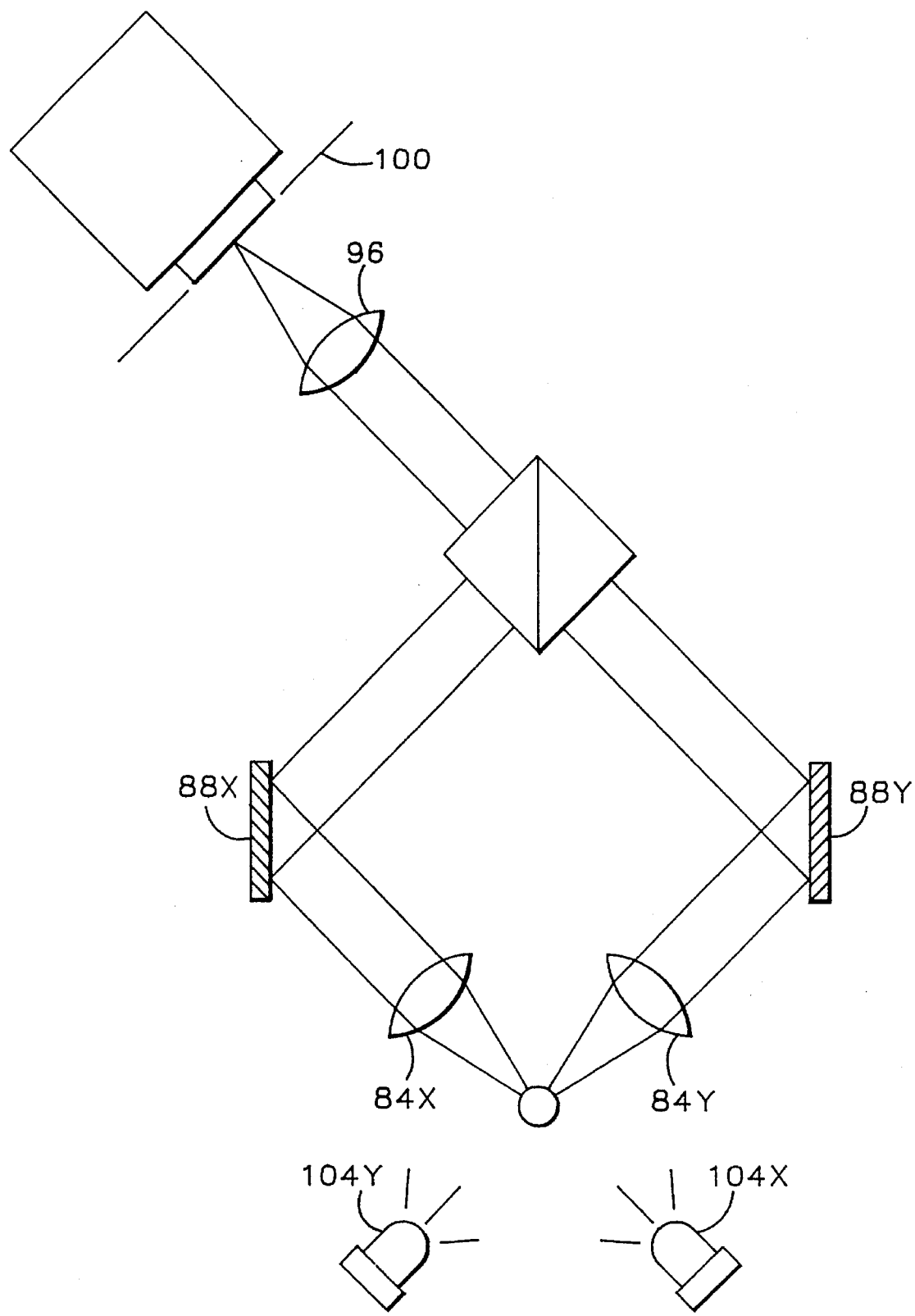
FIG. 4 is a schematic view of an optical system that forms part of the apparatus.

Referring to FIGS. 1–3, the apparatus shown in the drawings comprises a base 10 that carries a linear guide (not shown) that defines a horizontal path of movement along an axis 16 and supports an interchangeable cassette or carriage 18 for linear movement along the horizontal axis 16, driven by a stepping motor 22 through a lead screw 24 and nut (not shown). A ribbon fiber clip or clamp 26 is mounted to the carriage 18 and holds an end segment of a ribbon fiber 28 so that the free end of the ribbon extends clear of the clamp. The end segment of the ribbon fiber is horizontal and extends perpendicular to the axis 16. As is well known, the ribbon fiber comprises multiple component fibers bonded together in spaced side-by-side relationship. Typically, the diameter of each fiber is about 125 µm and the axis-to-axis spacing of the component fibers is about 250 µm. The axes of the component fibers are coplanar within about 10–15 µm. The ribbon fiber is positioned in the clamp so that the plane containing the central axes of the end segments of the component fibers is horizontal and these axes are perpendicular to the axis 16.

A Y-axis platform 40 is mounted to the base 10 for pivotal movement about a horizontal axis 42. The axis 42 is defined by balls 43 seated in respective recesses and is perpendicular to the axis 16. The Y-axis platform is driven by a Y-axis stepping motor 44 that is effective between the base 10 and the Y-axis platform 40. The Y-axis motor is coupled through a transmission to raise and lower a ball 45, which fits in a recess defined at the base of an articulation link that has a second ball 46 at its upper end. The ball 46 fits in a recess defined by a cup that is secured to the platform 40. Tension springs 47 hold the balls 43, 45, and 46 seated in their respective recesses.

An X-axis platform 48 is mounted to the Y-axis platform 40 for pivotal movement about an axis 52 that is defined by balls 53 seated in respective recesses and is parallel to the axis 42. The X-axis platform is driven by an X-axis stepping motor 56 that is effective between the Y-axis platform 40 and the X-axis platform. The X-axis motor is coupled through a transmission to raise and lower a ball 57 that fits in a recess at the base of an articulation link that has a second ball 58 at its upper end. The ball 58 fits in a recess defined by a cup that is secured to the platform 48. Tension springs 59 hold the balls 53, 57, and 58 seated in their respective recesses.

Figure 6A:
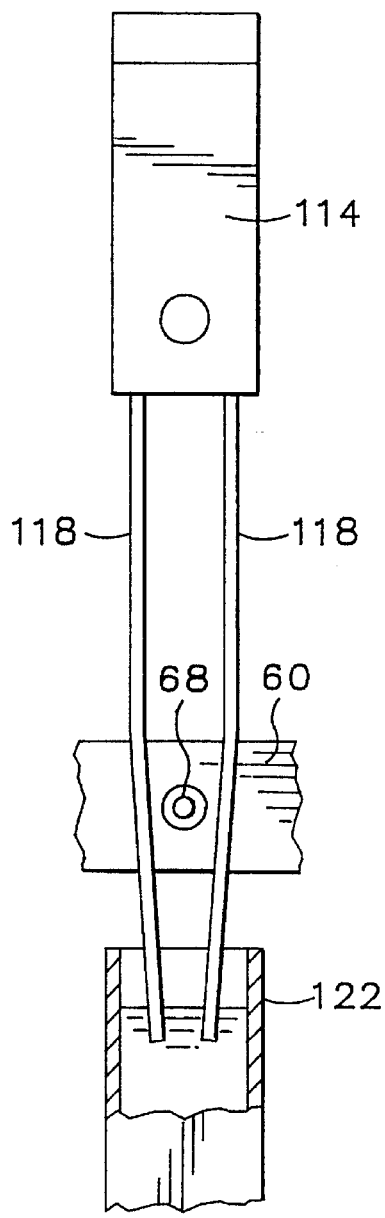
Figure 6B:
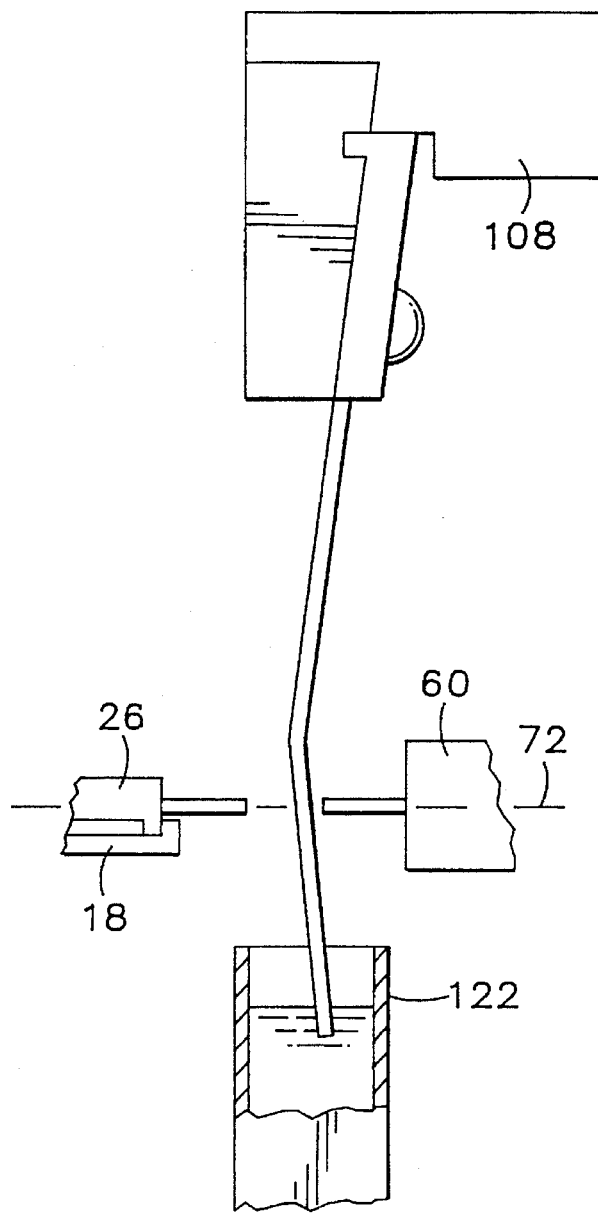

A Z-axis platform 60 is mounted on the X-axis platform 48 for linear movement parallel to the axes 42 and 52, driven by a Z-axis stepping motor 64 through a linkage 66. The Z-axis platform 60 carries a single fiber clip (not shown) that holds an end segment 68 of a single buffer fiber so that the free end of the fiber is disposed along an axis 72 that is parallel to the axes 42 and 52 and extends toward the ribbon fiber, as shown in FIG. 6B, for example. Therefore, the end segment of the buffer fiber is horizontal and extends perpendicular to the axis 16. The I/O port of an OTDR 70 (FIG. 13) is optically coupled to the buffer fiber at the opposite end thereof.

The motors 22, 44, 56, and 64 operate under control of commands issued by a controller 66, which stores as a variable for each motor the cumulative number of steps through which its shaft has rotated since executing a calibration routine. The current values of these variables define the positions of the carriage 18 and the platforms 40, 48, and 60.

Pivotal movement of the Y-axis platform 40 through a small angle about the axis 42 results in displacement of the axis 72 along an arcuate path that is at approximately 45° to horizontal, and pivotal movement of the X-axis platform 48 through a small angle about the axis 52 results in displacement of the axis 72 along an arcuate path that is at approximately 45° to horizontal and is approximately perpendicular to the path of movement about the axis 42. The distances between the axis 72 and the axes 42 and 52 are such that the movement of the axis 72 is almost rectilinear. Therefore, pivotal movement of the platforms 40 and 48 displaces the end segment of the buffer fiber substantially along X and Y axes that are perpendicular to one another and lie in a plane that is parallel to the vertical plane containing the axis 16. Accordingly, by selective operation of the motors 44 and 56, the end segment of the buffer fiber can be displaced in any direction perpendicular to its length.

When the platforms 40 and 48 are at the respective centers of their ranges of movement, the distal end segment of the buffer fiber is at approximately the same vertical level as the horizontal plane containing the proximal end segments of the components of the ribbon fiber, and by operation of the stepping motor 22, the proximal end segment of any selected component of the ribbon fiber can be brought into substantial alignment with the distal end segment of the buffer fiber.

Referring to FIGS. 1–4, the Z-axis platform 60 carries an optical system 80 for viewing a measurement zone in two directions at right angles. The measurement zone contains the distal end segment of the buffer fiber. The optical system comprises a lens 84X whose optical axis is perpendicular to the Z-axis and is at 45° to horizontal when the platforms 40 and 48 are in their center positions. A mirror 88X receives the beam provided by the lens 84X and reflects it toward a beam splitter 92. The beam splitter also receives a beam provided by a lens 84Y and mirror 88Y and combines the beams to provide a single beam that is folded by a mirror 94 so that it is parallel to the axis 72 and is imaged by a lens 96 in a viewing plane 100. The field of view of the lens 84X contains the X-axis of displacement of the end segment of the buffer fiber, whereas the field of view of the lens 84Y contains the Y-axis of displacement of the end segment of the buffer fiber.

Figure 13:
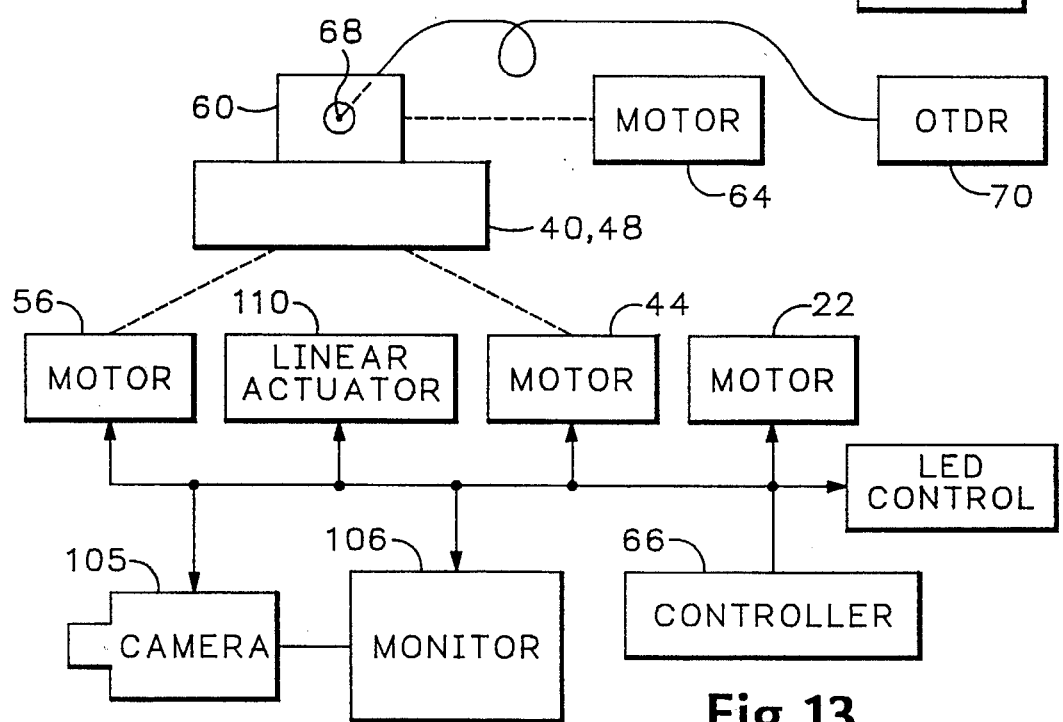
FIG. 13 is a block diagram illustrating the apparatus in simplified form.

The optical system 80 also comprises a light emitting diode (LED) 104X on the axis of the lens 84X, and an LED 104Y on the axis of the lens 84Y. The LED 104X emits light in a narrow cone, so that it illuminates the measurement zone without introducing light into the lens 84Y. Similarly, the LED 104Y illuminates the measurement zone without introducing light into the lens 84X. Thus, when only one LED is energized, the image in the plane 100 is representative of the field of view that is illuminated by that LED, whereas if both LEDs are energized, images of the two fields of view are superimposed in the viewing plane. The image in the viewing plane is viewed using a video camera 105 and monitor 106 (FIG. 13). This allows automatic analysis of the image as described in the patent application Ser. No. 08/147, 047 filed Nov. 2, 1993, now U.S. Pat. No. 5,375,179, the disclosure of which is hereby incorporated by reference herein.

Referring to FIG. 5, the X-axis platform 48 also carries a dipper arm 108 that is displaceable relative to the platform 48 in a direction that is vertical when the platforms 40 and 48 are at their center positions. A linear actuator 110 is used to raise and lower the dipper arm 108 relative to the platform 48 under control of commands provided by the controller 66. Since the dipper arm 108 is mounted to the platform 48, its position is not dependent upon the position of the Z-axis platform 60.

The dipper arm 108 carries a clamp 114 from which two slim wires 118 extend. As shown in FIGS. 6A and 6B, the two wires 118 converge in the downward direction and their tips are inclined downward in the direction from the distal end of the buffer fiber toward the proximal end of the test fiber. The two wires are disposed to opposite respective sides of a vertical plane containing the axis 72. When the dipper arm 108 is raised, the wires 118 pass on either side of the axis 72.

A small cup 122 is mounted to the platform 48 below the axis 72 of the buffer fiber end segment 68 at a position such that on operation of the linear actuator 110, the tips of the wires can be lowered into the cup 122 and raised from the cup 122. The cup contains a bath of index-matching oil.

The dipper arm 108 has a home position in which the free ends of the wires 118 are immersed in the oil in the cup 122. While the dipper platform is in the home position, one of the test fibers is aligned with the buffer fiber. This is accomplished by displacing the carriage 18 along the axis 16 to bring the proximal end segment of the selected test fiber into approximate axial alignment with the distal end segment of the buffer fiber, viewing the buffer fiber and the selected test fiber through the optical system 80, and employing the motors 44 and 56 to pivot the platforms 40 and 48 and thereby displace the distal end segment of the buffer fiber along the X and Y axes into more precise alignment with the proximal end segment of the selected test fiber. In this manner, the distal end segment of the buffer fiber can be brought into alignment with the proximal end segment of the selected test fiber to within about 2 μm. Delivery of commands to the motors 44 and 56 may be based on operator input, in response to viewing the images displayed by the monitor, or it may be based on machine vision as described in the co-pending application. If machine vision is used to view the measurement zone, the machine vision can also be used to measure the distance between the confronting end faces of the buffer fiber and test fiber respectively.

When the distal end segment of the buffer fiber and the proximal end segment of the test fiber are properly aligned, the controller issues a command to the actuator 110 to raise the dipper arm from the home position. As shown in FIGS. 7 and 8, when the dipper arm is raised, the free ends of the wires 118 are raised from the bath of oil in the cup 122 and a small drop 124 of oil is formed between the free ends of the wires 118. When the dipper arm reaches the top of its range (FIG. 8), the drop is located at the level of the axis 72. As shown in FIG. 8B, the end face of the buffer fiber is within the drop. The controller then issues a command to the Z-axis motor 64, causing it to displace the Z-axis platform 60 in the direction to the right of FIG. 8B, so that the end face of the buffer fiber is withdrawn from the oil drop, as shown in FIG. 9. A small droplet 126 adheres to the end face of the buffer fiber, while the greater part of the drop remains adhered to the lower ends of the wires 118. By drawing the buffer fiber out of the drop in this manner, the surface tension of the oil tends to pull the oil that remains on the buffer fiber toward the end face, so that it does not paint the lateral surfaces of the buffer fiber. The controller then issues a command to the actuator 110, causing it to lower the dipper arm to its home position (FIG. 10), as shown by the arrow 128. If machine vision is employed, the controller issues a command to the Z-axis motor 64 causing it to advance the Z-axis platform in the direction of the arrow 130 by slightly less than the measured distance between the end faces of the two fibers and thereby position the end face of the buffer fiber in close proximity with the end face of the test fiber. Alternatively, the operator can view the image of the buffer fiber and test fiber displayed by the monitor as the buffer fiber is advanced in the direction of the arrow 130, to ensure that the fibers do not collide. In either case, the droplet of oil that was retained on the end face of the buffer fiber, as explained with reference to FIG. 9, provides optical coupling between the buffer fiber and the test fiber.

When the fibers are optically coupled, the OTDR carries out a test by launching pulses of optical energy into the test fiber by way of the buffer fiber and detecting optical energy returned from the test fiber by way of the buffer fiber. When the test is complete, the Z-axis motor drives the Z-axis platform to the right of FIG. 10B, back to the position shown in FIG. 6B, and the motor 22 displaces the carriage 18 to position the next component fiber of the ribbon for testing. The test is complete when all fibers have been tested.

By immersing the wires in the oil and lifting the wires from the oil, a small (sub microliter) drop of oil is formed on the tips of the wires. The size of drop depends on the diameter of the wires, the speed with which the wires are raised, the viscosity of the oil, and the surface tension of the oil. To achieve a desired drop size with oil of a particular viscosity and surface tension, the speed with which the wires are raised can easily be adjusted, and wires of appropriate thickness can be selected. Further, the size of the drop depends on the spacing between the tips of the wires, but in order to avoid interference with the buffer fiber, it is desirable that the spacing not be changed. By positioning the drop so that the end face of the buffer fiber is inside the drop and then withdrawing the buffer fiber from the drop, a small (sub nanoliter) part of the original drop is retained by the buffer fiber. The droplet that adheres to the end face of the buffer fiber is approximately hemispherical. In the case of a buffer fiber having a diameter of about 125 μm, the volume of the droplet is on the order of $10^{-13}$ m$^3$, or about $10^{-10}$ l.

Figure 12:
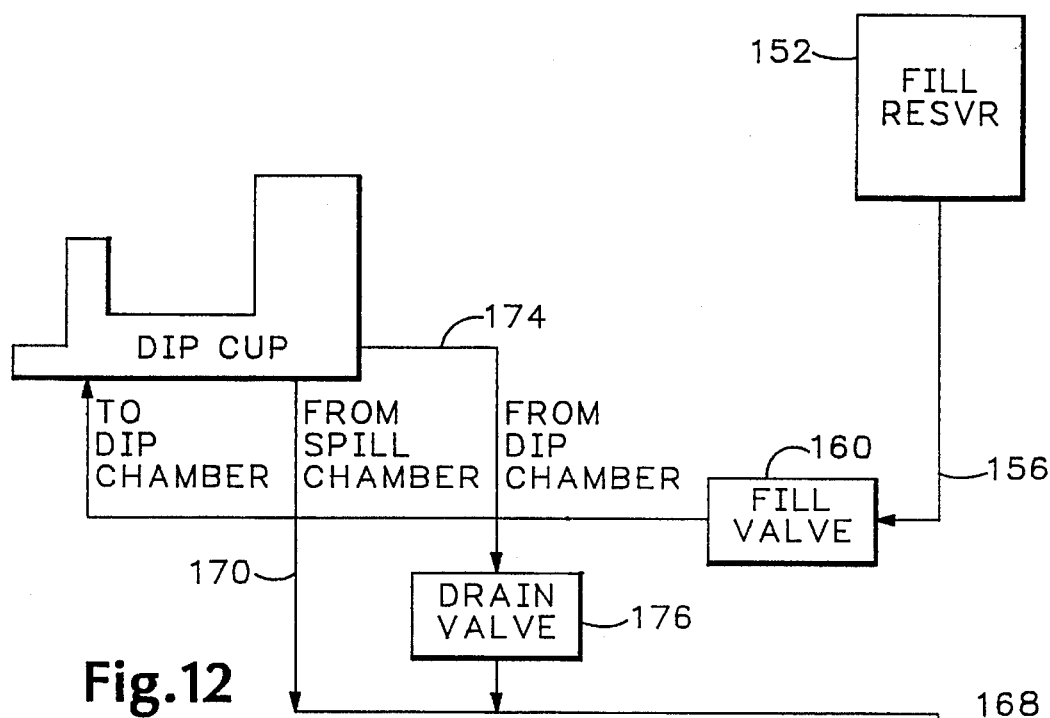
FIG. 12 is a schematic view of a fluid flow system that is connected to the part shown in FIG. 11.

Referring to FIGS. 11 and 12, the cup 122 defines three distinct chambers. The main chamber 134 is the chamber in which the lower ends of the wires 118 are disposed when the dipper arm is in the home position. The chamber 134 communicates with a level control chamber 138 by way of a passage 142. The level control chamber 138 is separated from a spill chamber 146 by a wall 150, the top of which is lower than the walls bounding the main chamber 134. A supply reservoir 152 is connected to the main chamber 134 by way of a tube 156 containing a normally closed supply valve 160. The spill chamber 146 has an outflow opening 164 that communicates with a collection reservoir 168 by way of a tube 170, and the passage 142 communicates with the collection reservoir 168 by way of a tube 174 provided with a normally closed drain valve 176. The two valves 160 and 176 are solenoid valves that operate under control of the controller 66.

In order to ensure that the accuracy of the test results is not impaired by contamination or aging of the oil, the controller operates the solenoid valves 160 and 176 to ensure that the contents of the cup 122 are periodically drained and replaced with fresh oil. Further, in order to ensure that the level of oil in the cup remains substantially constant, the controller periodically replenishes the oil in the cup.

When the apparatus is first brought into service, so that the cup 122 is empty, fresh index-matching oil is placed in the supply reservoir 152 and the valve 160 is opened, so that oil flows under gravity into the main chamber 134. The supply valve 160 is closed after lapse of a predetermined time sufficient for the oil to fill the cup to the level of the top of the wall 150. Any additional oil overflows into the spill chamber 146 and passes to the collection reservoir. During subsequent operation of the apparatus, the valve 160 is opened periodically in order to replenish the cup. The frequency with which the supply valve 160 is opened might depend on the amount of use being made of the apparatus. For example, the controller might count the number of times the wires are dipped into the cup, and open the valve 160 each time the count reaches a predetermined value. In order to flush contaminants from the cup and replace the oil in the cup with oil that has not been exposed to the air and other environmental agents, such as light, the controller periodically opens the drain valve 176 and allows the contents of the cup to drain, and then opens the valve 160 to supply oil for washing residual oil from the cup, closes the drain valve 176, and closes the supply valve 160 when sufficient time has elapsed to fill the cup to the top of the wall 150.

It will be seen from FIG. 3 that the carriage 18 has several stalls for receiving the clamp 26. The clamp is held in the selected stall by magnetic attraction. Between two of the stalls is a cleaning head 180, which can be used for cleaning oil from the buffer fiber in the event that excess oil becomes deposited on the buffer fiber and interferes with viewing of the buffer fiber.

It will be appreciated that the invention is not restricted to the particular embodiment that has been described, and that variations may be made therein without departing from the scope of the invention as defined in the appended claims and equivalents thereof. For example, although it is desirable to use two wires to form the drop, because they do not interfere with viewing of the measurement zone using the optical system shown in FIG. 5, the invention is not restricted to use of two wires in this way. Further, although pivotal movement of the platforms 40 and 48 provides a convenient approximation to linear movement over the ranges involved, the invention is not restricted to this expedient. The invention is not restricted to use in connection with optical fibers, and has application to other situations in which it is necessary or desirable to form a very small droplet at a controlled location with a high degree of consistency.

The invention is not restricted to use of the particular optical system that has been shown and described, since in some circumstances it may be desirable to use a different system. For example, use of two separate cameras, receiving the beams provided by the two lenses 84X and 84Y respectively, might avoid difficulties that could arise in combining the beams using the beam splitter 92.

We claim:

1. A method of applying a controlled quantity of liquid to a free end of a rod-shaped target object, comprising:

(a) providing a bath of said liquid, a dipper member having two portions in spaced relationship, and a means for bringing about vertical relative movement between the dipper member and the bath, (b) lowering the dipper member relative to the bath to at least partially immerse said portions of the dipper member in the bath, and subsequently raising the dipper member relative to the bath, whereby a drop of liquid is suspended between said portions of the dipper member, (c) positioning the dipper member and the target object so that the free end of the target object is between said portions of the dipper member, and (d) bringing about movement of the target object relative to the dipper member, whereby the free end of the target object is removed from between said portions of the dipper member and a portion of the drop adheres to the target object.

2. A method according to claim 1, wherein the dipper member comprises a yoke portion and two tines extending downwardly from the yoke portion, and the method comprises positioning the target object horizontally and positioning the dipper member so that the two tines are to opposite sides respectively of a vertical plane containing the central axis of the target object.

3. A method according to claim 1, comprising retaining the target object and the bath substantially stationary relative to each other, and step (b) comprises lowering the dipper member relative to both the bath and the target object.

4. A method according to claim 1, wherein step (d) comprises displacing the target object relative to both the dipper member and the bath.

5. A method according to claim 1, wherein step (d) comprises moving the target object axially away from the dipper member in a direction from said free end of the target object toward an opposite end thereof.

6. A method according to claim 1, wherein the target object is an end segment of a buffer optical fiber, and the method further comprises:

(e) bringing about relative movement between the buffer fiber segment and an end segment of a test optical fiber, whereby the free end of the buffer fiber segment is brought into close, non-contacting, coaxially aligned relationship with a free end of the test fiber segment and the fiber segments are optically coupled through the portion of the drop of liquid, and (f) launching a pulse of optical energy into the test fiber by way of the buffer fiber and detecting optical power emitted by the test fiber at an end thereof.

7. A method according to claim 6, wherein step (e) comprises:

positioning the buffer fiber segment in spaced coaxially aligned relationship with the test fiber segment, and bringing about axial relative movement of the fiber segments so that the free end of the test fiber segment contacts said portion of the drop adhering to the buffer fiber segment.

8. A method according to claim 6, wherein the test fiber is a first fiber of a ribbon fiber and the method further comprises:

bringing about axial relative movement of the buffer fiber segment and the test fiber segment so that the end face of the buffer fiber is separated from the end face of said first fiber, selecting a second fiber of the ribbon fiber as a test fiber, and repeating steps (b)–(e).

9. A method of testing an optical fiber, comprising:

(a) positioning an end segment of a first fiber in the vicinity of an end segment of a second fiber, each of said end segments having a free end and one of said end segments being a distal end segment of a buffer fiber and the other of said end segments being a proximal end segment of the test fiber, (b) positioning the distal end segment of the buffer fiber and the proximal end segment of the test fiber so that they are in spaced coaxially aligned relationship, (c) bringing about relative movement between a dipper member and a bath of index-matching liquid, whereby the dipper member is partially immersed in the bath, (c) bringing about relative movement between the dipper member and the bath, whereby the dipper member is removed from the bath with a drop of liquid adhered to the dipper member, (d) bringing about relative movement between the dipper member and the end segment of the first fiber, whereby the free end of the end segment of the first fiber is positioned in the drop and is removed from the drop so that a droplet of liquid remains thereon, (e) bringing about relative movement between the proximal end segment of the test fiber and the distal end segment of the buffer fiber along their common axis, whereby said distal end segment and said proximal end segment are brought into close non-contacting relationship and the free end of the end segment of the second fiber contacts said droplet, and (f) launching a pulse of optical energy into the test fiber by way of the buffer fiber and detecting optical power emitted by the fiber at an end thereof.

10. A method according to claim 9, wherein the test fiber is a first componet fiber of a ribbon fiber and the method further comprises:

bringing about axial relative movement of the end segments so that the end face of the buffer fiber is separated from the end face of said first componet fiber, selecting a second componet fiber of the ribbon fiber as a test fiber, and repeating steps (A)–(F).

* * * * *